United States Patent
Demchuk et al.

[15] 3,650,014
[45] Mar. 21, 1972

[54] METHOD OF EXPLOSIVE WELDING OF METAL PLATES

[72] Inventors: Alexandr Fedorovich Demchuk, Akademicheskoya ulitsa 25, kv. 47; Andrei Andreevich Deribas, ulitsa Pravdy, 1, kb. 20, both of Novosibirsk; Vladimir Mikhailovich Kudinov, ulitsa Filatova 1/22, kv. 51, Kiev; Felix Iovich Matveenkov, ulitsa Prandy, I, kv. 24; Valery Alexandrovich Simonov, bulvar Molodezhi, 30, kv. 19, both of Novosibirsk, all of U.S.S.R.

[22] Filed: Aug. 15, 1969

[21] Appl. No.: 850,382

[52] U.S. Cl. ...............................29/470.1, 29/486, 29/497.5
[51] Int. Cl. .........................................................B23k 21/00
[58] Field of Search ..................29/470.1, 486, 421 E, 497.5

[56] References Cited

UNITED STATES PATENTS

| Re.26,858 | 4/1970 | Chudzik | 29/470.1 |
| 3,474,520 | 10/1969 | Takizawa et al. | 29/470.1 |
| 3,434,197 | 3/1969 | Davenport | 29/470.1 |
| 3,419,951 | 1/1969 | Carlson | 29/470.1 |
| 3,417,455 | 12/1968 | Pearson | 29/470.1 |
| 3,377,693 | 4/1968 | Fukumoto | 29/470.1 |
| 3,346,946 | 10/1967 | Riegelmayer | 29/470.1 |
| 3,233,312 | 2/1966 | Cowan et al. | 29/470.1 X |
| 3,140,537 | 7/1964 | Popoff | 29/421 X |

*Primary Examiner*—John F. Campbell
*Assistant Examiner*—Ronald J. Shore
*Attorney*—Waters, Roditi, Schwartz & Nissen

[57] ABSTRACT

Metal plates are welded together by spacing base plates apart in a horizontal row and interdigitating pairs of plates to be welded to the base plates along with explosive charges which are placed between the plates of the pairs.

54 Claims, 8 Drawing Figures

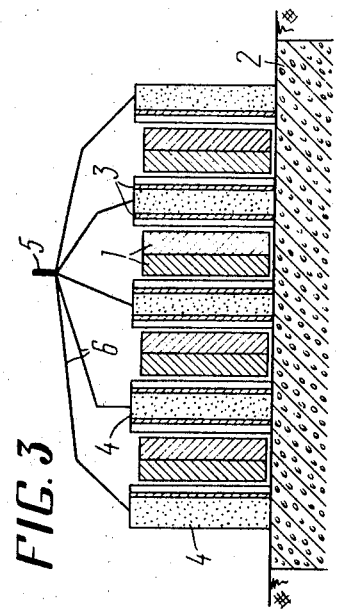
FIG.1
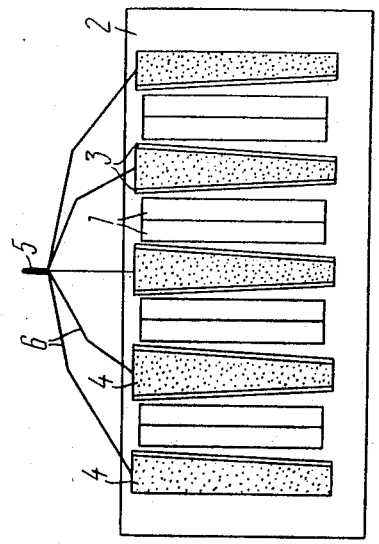
FIG.3
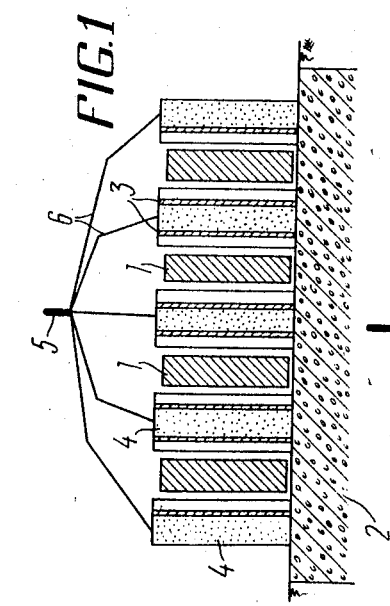
FIG.2
FIG.4

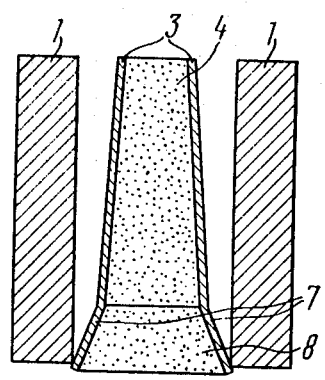
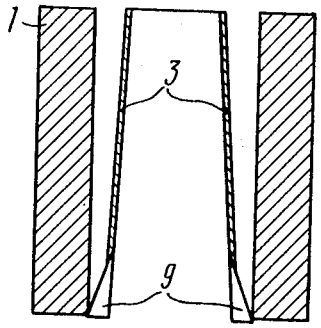
FIG.5  FIG.6
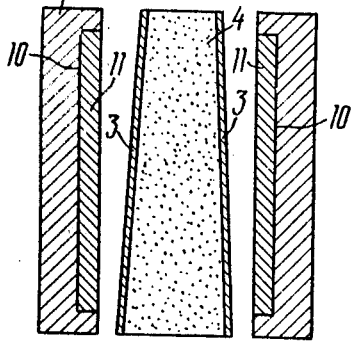
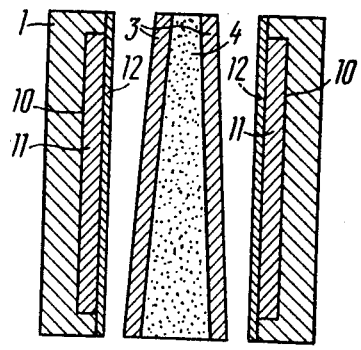
FIG.7  FIG.8

METHOD OF EXPLOSIVE WELDING OF METAL PLATES

The present invention relates to welding practices and to the production of multilayer materials, and more specifically to methods for the explosive welding of metals, and to methods of obtaining double- and multilayer metal plates and various multilayer products used in the chemical, electronic, atomic, missile and other engineering fields.

Known in the art are methods further explosive welding of metal plates which provide for explosive welding of one or several plates to one base metal plate in one operation.

These methods, however, do not insure adequate productivity and in considerable consumption of explosives, as well as insufficient quality of the multilayer plates obtained. Accordingly, they do not comply with industrial requirements.

An object of the present invention is to provide a simple and highly efficient method further explosive welding of metal plates, that permits obtaining several double- or multilayer metal plates in one operation. Another object of the present invention is to insure a considerable economy of explosives.

Still another object of the invention is to raise the quality of the multilayer metal plates obtained.

In accordance with the above and other objects, in the method for the explosive welding of metal plates according to the invention several base plates are set edgewise at least in one horizontal row, their welding sides facing each other at a certain distance and in each gap between these plates with certain clearances therefrom at least two plates to be welded on, having no contact with one another, are placed edgewise, their welding sides facing the base plates, explosive charges common for the plates to be welded on are placed therebetween whereupon all the explosive charges in at least one row are simultaneously initiated.

It is advisable that the base plates set edgewise in at least one horizontal row should be arranged in pairs, their non-welding surfaces contacting each other.

It is preferred that the plates to be welded on should be located between the base plates at a certain angle to the latter from the place of charge initiation in the direction of the detonation front propagation.

It is advantageous that at least two plates to be welded on should have their portions closest to the base plates bent off towards the latter, and an explosive of greater power be placed between these bent off portions as compared to that placed between the remaining noncontacting portions of the plates to be welded on, and then all the explosive charges be initiated simultaneously from the side of the bent off portions of the plates to be welded on, in at least one row.

In the plates to be welded on their corners closest to the base plates are advisable bent off towards the latter.

The bent off portions of the plates to be welded on are desirably deflected to an angle of 4° to 12° depending on the detonation rate of the explosive of greater power.

These bent off portions advisably have a length 8 to 12 times as great as the thickness of the plate to be welded on, in the direction of the detonation front propagation.

The layer of the explosive of greater power between the bent off parts of the plates to be welded on is desirably uniformly reduced in thickness from the place of initiation to the beginning of the explosive charge between the remaining portions of said plates.

The thickness of layers of the explosive can be uniformly decreased by about one-third thereof from the place of charge initiation in the direction of the detonation front propagation.

The base plates and the plates to be welded on are advisably located in parallel to each other, and between the plates to be welded on explosive charges should be placed whose rate of detonation does not exceed sound propagation velocity in the metals of said plates.

When welding together metal plates made of brittle metals it is preferable to preheat them.

On the welding surfaces of the base metal plates depressions can be made to be filled with a lower-melting metal, for instance, tin, and after at least one plate to be welded on is joined by the explosion method to the welding surface of each said base plate, the low-melting metal should be fused out from the cavities formed between the plates welded together.

On the welding surfaces of the base metal plates depressions can be made to be filled, alternatively, with a soluble material, for instance, sodium chloride, and after at least one plate to be welded on is joined by the explosion method to the welding surface of each said base plate, the soluble material should be removed from the cavities formed between the plates welded together.

One additional thin metal sheet is desirably prewelded by the explosion method to the welding surfaces of each base plate with filled depressions.

Other objects and advantages of the present invention will become apparent from the following description with reference to the accompanying drawings, wherein:

FIG. 1 illustrates schematically, in accordance with the invention, several base plates and plates to be welded on together with the explosive charges, all placed edgewise in one row, the arrangement being shown in side view (longitudinal section);

FIG. 2 is a top view of the arrangement of FIG. 1;

FIG. 3 is a view similar to FIG. 1, the base plates being arranged in pairs, their non-welding surfaces contacting each other;

FIG. 4 is a top view of the arrangement of FIG. 3;

FIG. 5 is a top view of plates to be welded on, with bent off parts and the explosive charge therebetween, all located between the base plates;

FIG. 6 is a view similar to FIG. 5 showing bent off corners (the explosive charge not being shown);

FIG. 7 shows the plates to be welded on and the base plates having depressions filled with a low-melting metal or a soluble material, the view being a longitudinal section across the depressions;

FIG. 8 is a view similar to FIG. 7 with an additional thin metal sheet prewelded to each base metal plate by the explosive method.

Explosive welding of metal plates according to the invention is carried out as follows.

Several base plates 1 (FIGS. 1 and 2) are, in accordance with the invention, placed edgewise on footing 2 in at least one horizontal row, their welding sides facing each other at a certain distance. In each gap between the base plates 1 with certain clearances therefrom at least two plates 3 to be welded on, having no contact with one another, are placed edgewise as well, their welding sides facing said base plates, while beside each extreme base plate in the said row at least one plate to be welded on is placed, also edgewise. Between plates 3 to be welded on, common explosive charges 4 are placed, the explosive charges used on the extreme plates to be welded on having a power equal to that of the charges used between the plates to be welded on. All the explosive charges 4 are simultaneously set off by one detonator 5, whose initiating pulse is transmitted to each explosive charge 4 through pieces of detonating cord 6 of equal length.

As a result of explosive welding according to the described procedure plates 3 are welded simultaneously to each base plate 1, one on either side thereof.

To weld plates 3 to only one side of each base plate 1, the latter are again set edgewise (FIGS. 3 and 4) in at least one horizontal row, and are arranged in pairs, so that their non-welding surfaces contact each other.

Plates 3 to be welded on (FIGS. 1–4) are placed between the base plates 1 at a certain angle to the latter from the initiation place of the explosive charge 4 in the direction of the detonation front propagation. The thickness of the layer of the explosive charges 4 located between plates 3 to be welded on is uniformly decreased from the place of initiation of the charges in the direction of the detonation front propagation. The value of the reduced layer thickness of the explosive charges 4 should be about one-third of the initial charge thickness. However, in case of small thickness of plates 3 to be welded on, it is advisable to place the explosive charges 4 between plates 3 in uniform layers.

When welding base plates 1 with plates 3 of considerable thickness (5 mm. and more), to improve the quality of welding in the initial portion of the weld, plates 3 to be welded on have their portions 7 (FIG. 5) closest to the base plates 1 bent off towards the latter. Placed between the bent off portions 7 of plates 3 to be welded on is an explosive of greater power than that placed between the remaining portions of these plates. The explosive charges 4 are initiated from the side of the more powerful explosive 8.

In some cases it is advisable that plates 3 to be welded on should have their corners 9 (FIG. 6) closest to the base plates 1 bent off towards the latter, a more powerful explosive (not shown in FIG. 6) being again placed between these bent off corners.

Portions 7 or corners 9 of plates 3 to be welded on are bent off towards the base plates 1 to an angle of 4° to 12° depending on the detonation rate of the explosive of greater power and the thickness of the plates to be welded on.

Portions 7 or corners 9 of plates 3 to be welded on are bent off over a length 8 to 12 times as great as the thickness of said plates in the direction of the detonation front propagation.

The thickness of the layer of explosive 8 of greater power between the bent off portions 7 or corners 9 of plates 3 to be welded on is advisably uniformly reduced from the place of initiation to the beginning of the explosive charge 4 between the remaining portions of the plates to be welded on.

In some cases the base plates 1 and plates 3 to be welded on are set parallel to one another (not shown in the drawings), the explosive charges used between plates 3 then having a rate of detonation that does not exceed sound propagation velocity in the metals of plates to be welded together.

When welding together metal plates made of brittle metals, they are preheated to insure a quality joint.

To obtain welded products with internal cavities, depressions 10 of required shape are formed on the welding surfaces of the base plates 1 to be then filled with a low-melting metal 11 or a soluble material 11. Tin, lead, their alloys, various salts and other materials may be used as fillers.

To the welding surfaces of the base plates 1 thus prepared plates 3 are explosion-welded, after which the filler is removed from the cavities formed between the plates welded together.

To prevent breakage of plates 3 to be welded on when their thickness is over 5 mm., it is advisable to preweld, by the explosion technique, one additional thin metal sheet 12 (FIG. 8) to each welding surface of the base plates 1.

In all the above-described cases several plates 3 can be welded simultaneously to each base plate 1 (not shown in the drawings). In this case the explosive charge 4 is located between those two adjacent plates 3 to be welded on that are most distant from their respective base plates 1.

The described method is mainly advisable for the cases when the base plates 1 are of considerable thickness.

Explosive welding of metal plates according to the invention has the following advantages.

Setting of the base plates 1 and plates 3 to be welded thereon edgewise in a row permits obtaining in one operation, a considerable number of multilayer metal plates, and makes possible mechanization of assembly operations in factory conditions (mounting of base plates and plates to be welded on), which fact sharply raises the productivity, a high quality of weld joints being insured.

Welding two or several plates 3 to two base plates by one common explosive charge 4 raises the explosion efficiency 1.5 to 5 times.

Symmetrical load distribution in explosion welding rule out any sagging of the base plates 1, substantially facilitating further working of the latter.

We claim:

1. A method for the explosive welding of metal plates, said method comprising setting at least two metal base plates on their edge in at least one horizontal row with the surfaces of the plates to which a weld is to be effected facing each other and spaced from each other to form at least one gap, and in each gap between said plates placing by setting on their edge at least two metal plates to be welded on, spaced from one another and at least in part from the corresponding base plates, with the welding surfaces thereof facing the base plates, placing between the plates to be welded on in each gap explosive charges common thereto, placing explosive charges outside of the endmost of said base plates in each said horizontal row, and simultaneously firing the explosive charges in at least one said row explosively weld said plates to be welded on to said base plates.

2. A method according to claim 1, wherein the base plates in at least one horizontal row are arranged in pairs with their non-welding surfaces in contact with each other.

3. A method as set forth in claim 1, wherein the plates to be welded on are located between the base plates at an angle to the latter.

4. A method as defined in claim 2, wherein the plates to be welded on are located between the base plates at an angle to the latter.

5. A method according to claim 1, wherein at least two plates to be welded on have portions which are closest to the base plates and which are bent towards the latter, comprising placing between the bent off portions of the plates to be welded on an explosive of greater power than that between the remaining portions of the plates to be welded on, firing of the explosive charges being simultaneously initiated starting with the explosive of greater power.

6. A method, as claimed in claim 2, wherein at least two plates to be welded on have portions which are closest to the base plates and which are bent towards the latter, comprising placing between the bent off portions of the plates to be welded on an explosive of greater power than that between the remaining portions of the plates to be welded on, firing of the explosive charges being simultaneously initiated starting with the explosive of greater power.

7. A method as set forth in claim 3, wherein at least two plates to be welded on have portions which are closest to the base plates and which are bent towards the latter, comprising placing between the bent off portions of the plates to be welded on an explosive of greater power than that between the remaining portions of the plates to be welded on firing of the explosive charges being simultaneously initiated starting with the explosive of greater power.

8. A method according to claim 5, wherein the plates to be welded on have corners which are closest to the base plates and which are bent towards the latter.

9. A method according to claim 5, wherein the bent portions of the plates to be welded on are bent towards the base plates at an angle of 4° to 12° depending on the detonation rate of the explosive of greater power.

10. A method as claimed in claim 8, wherein the bent corners of the plates to be welded on are bent towards the base plates at an angle of 4° to 12° depending on the detonation rate of the explosive of greater power.

11. A method as claimed in claim 5, wherein the explosive charges are characterized by a direction of detonation front propagation and the bent portions of the plates to be welded on are bent over a length equaling 8 to 12 times the thickness of said plates in the direction of the detonation front propagation.

12. A method as set forth in claim 8 wherein the explosive charges are characterized by a direction of detonation front propagation and the bent corners of the plates to be welded on are bent over a length equaling 8 to 12 times the thickness of said plates in the direction of the detonation front propagation.

13. A method as defined in claim 9, wherein the explosive charges are characterized by a direction of detonation front propagation and the bent portions of the plates to be welded on are bent over a length equaling 8 to 12 times the thickness of said plates in the direction of the detonation front propagation.

14. A method according to claim 5, wherein the thickness of the layer of the explosive of greater power used between the bent portions of the plates to be welded on is uniformly reduced from the place of initiation to the beginning of the explosive charge between the remaining portions of said plates.

15. A method as defined in claim 8, wherein the thickness of the layer of the explosive of greater power used between the bent corners of the plates to be welded on is uniformly reduced from the place of initiation to the beginning of the explosive charge between the remaining portions of said plates.

16. A method as defined in claim 9, wherein the thickness of the layer of the explosive of greater power used between the bent portions of the plates to be welded on is uniformly reduced from the place of initiation to the beginning of the explosive charge between the remaining portions said plates.

17. A method as claimed in claim 11, wherein the thickness of the layer of the explosive of greater power used between the bent portions of the plates to be welded on is uniformly reduced from the place of initiation to the beginning of the explosive charge between the remaining portions of said plates.

18. A method as set forth in claim 3, wherein the explosive charges are characterized by a direction of detonation front propagation and the layer thicknesses of the explosives are uniformly reduced by about one-third thereof from the place of initiation in the direction of the detonation front propagation.

19. A method as set forth in claim 1, wherein the base plates and the plates to be welded on are set parallel to one another, and selecting explosive charges whose rate of detonation does not exceed sound propagation velocity in said plates.

20. A method as claimed in claim 2, wherein the base plates and the plates to be welded on are set parallel to one another, and selecting explosive charges, whose rate of detonation does not exceed sound propagation velocity in plates.

21. A method as set forth in claim 1, wherein before welding together metal plates made of brittle metals these plates are preheated.

22. A method as defined in claim 2, wherein before welding together metal plates made of brittle metals, these plates are preheated.

23. A method according to claim 3, wherein before welding together metal plates made of brittle metals these plates are preheated.

24. A method according to claim 5, wherein before welding together metal plates made of brittle metals these plates are preheated.

25. A method according to claim 8, wherein before welding together metal plates made of brittle metals these plates are preheated.

26. A method according to claim 9, wherein before welding together metal plates made of brittle metals these plates are preheated.

27. A method according to claim 11, wherein before welding together metal plates made of brittle metals these plates are preheated.

28. A method according to claim 14, wherein before welding together metal plates made of brittle metals these plates are preheated.

29. A method according to claim 19, wherein before welding together metal plates made of brittle metals these plates are preheated.

30. A method according to claim 20, wherein before welding together metal plates made of brittle metals these plates are preheated.

31. A method as claimed in claim 1, comprising forming depressions in the welding surfaces of the base metal plates and filling said depressions with a lower-melting metal, and after welding fusing out the low-melting metal.

32. A method as claimed in claim 2, comprising forming depressions in the welding surfaces of the base metal plates and filling said depressions with a lower-melting metal, and after welding fusing out the lower-melting metal.

33. A method as claimed in claim 3, comprising forming depressions in the welding surfaces of the base metal plates and filling said depressions with a lower-melting metal, and after welding fusing out the lower-melting metal.

34. A method as set forth in claim 5, comprising forming depressions in the welding surfaces of the base metal plates and filling the depressions with a lower-melting metal, and after welding fusing out the lower-melting metal.

35. A method as set forth in claim 8, comprising forming depressions in the welding surfaces of the base metal plates and filling the depressions with a lower-melting metal, and after welding fusing out the lower-melting metal.

36. A method as set forth in claim 9, comprising forming depressions in the welding surfaces of the base metal plates and filling the depressions with a lower-melting metal, and after welding fusing out the lower-melting metal.

37. A method as claimed in claim 11, comprising forming depressions in the welding surfaces of the base metal plates and filling the depressions with a lower-melting metal, and after welding fusing out the lower-melting metal.

38. A method as claimed in claim 14, comprising forming depressions in the welding surfaces of the base metal plates and filling the depressions with a lower-melting metal, and after welding fusing out the lower-melting metal.

39. A method as claimed in claim 19, comprising forming depressions in the welding surfaces of the base metal plates and filling the depressions with a lower-melting metal, and after welding fusing out the lower-melting metal.

40. A method as claimed in claim 20, comprising forming depressions in the welding surfaces of the base metal plates and filling the depressions with a lower-melting metal, and after welding fusing out the lower-melting metal.

41. A method as claimed in claim 21, comprising forming depressions in the welding surfaces of the base metal plates and filling the depressions with a lower-melting metal, and after welding fusing out the lower-melting metal.

42. A method as claimed in claim 1, comprising forming depressions in the welding surfaces of the base metal plates and filling the depressions with a soluble material, and after welding removing said soluble material.

43. A method according to claim 2, comprising forming depressions in the welding surfaces of the base metal plates and filling the depressions with a soluble material, and after welding removing said soluble material.

44. A method according to claim 3, comprising forming depressions in the welding surfaces of the base metal plates and filling the depressions with a soluble material, and after welding removing said soluble material.

45. A method according to claim 5, comprising forming depressions in the welding surfaces of the base metal plates and filling the depressions with a soluble material, and after welding removing said soluble material.

46. A method as defined in claim 8, comprising forming depressions in the welding surfaces of the base metal plates and filling the depressions with a soluble material, and after welding removing said soluble material.

47. A method as defined in claim 9, comprising forming depressions in the welding surfaces of the base metal plates and filling the depressions with a soluble material, and after welding removing said soluble material.

48. A method as defined in claim 11, comprising forming depressions in the welding surfaces of the base metal plates and filling the depressions with a soluble material, and after welding removing said soluble material.

49. A method as set forth in claim 14, comprising forming depressions in the welding surfaces of the base metal plates and filling the depressions with a soluble material, and after welding removing said soluble material.

50. A method as set forth in claim 19, comprising forming depressions in the welding surfaces of the base metal plates and filling the depressions with a soluble material, and after welding removing said soluble material.

51. A method as set forth in claim 20, comprising forming depressions in the welding surfaces of the base metal plates and filling the depressions with a soluble material, and after welding removing said soluble material.

52. A method according to claim 21, comprising forming depressions in the welding surfaces of the base metal plates and filling the depressions with a soluble material, and after welding removing said soluble material.

53. A method according to claim 31, wherein one additional thin metal sheet is first welded by explosion to each welding surface of the base plates with the filled depressions.

54. A method according to claim 42, wherein one additional thin metal sheet is first welded by explosion to each welding surface of the base plates with the filled depressions.

* * * * *